Jan. 27, 1970 G. H. GEISINGER 3,491,470

INDICIA SUPPORTING DEVICE

Filed Aug. 7, 1967

INVENTOR
GEORGE H. GEISINGER
BY David Teschner
ATTORNEY

United States Patent Office 3,491,470
Patented Jan. 27, 1970

3,491,470
INDICIA SUPPORTING DEVICE
George H. Geisinger, Elizabeth, N.J., assignor to Thomas & Betts Corporation, Elizabeth, N.J., a corporation of New Jersey
Filed Aug. 7, 1967, Ser. No. 658,756
Int. Cl. C09f 3/18
U.S. Cl. 40—10 4 Claims

ABSTRACT OF THE DISCLOSURE

An indicia supporting device for identifying cable bundles is formed of two complementary, spaced apart transparent surfaces for the receipt of an indicia bearing record therebetween. In a relaxed position the indicia record may be readily installed or removed. When applied to cable bundles, the contour of the supporting device is altered to prevent withdrawal of the record.

BACKGROUND OF THE INVENTION

Field of the invention

The invention pertains generally to the field of marking wherein it is desired to place an indicia bearing record upon or with a member to be marked in such a manner that the record is firmly attached to the member and is protected from destruction. The indicia bearing record is generally placed in an indicia supporting device. A common usage for this type of device is in the marking of cable bundles where it is desired to indicate coded information as to the type of wire, the destination, type of signals being carried or other necessary information required for routing, trouble shooting or similar operations. In a similar fashion, identification devices of this type may be used in hospitals whereby such an indicia supporting device may be affixed about a patient's arm so that the patient can be identified at all times. Similarly this device can be used for the identification of fish, birds or other forms of wild life whose migratory patterns, or manner of living are under examination. Similarly the devices have applicability to plumbing and similar fields, where again, it is necessary to identify a pipe as to its location and function.

DESCRIPTION OF THE PRIOR ART

In the prior art when it was desired to mark objects, such as cables, for example, it was necessary to affix thereto a tag of a material which was resistant to its environment. Such tags were generally of nylon or some other generally environment resistant material. However, it was not possible to write or place other indicia upon the nylon record directly, because the smooth surface thereof provided poor adhesion between the tag material and the indicia printing materials. Therefore, it was necessary to put the indicia on separate materials and then to laminate to nylon to form a protected unit. Other techniques employed were to print into the nylon material the indicia desired. This, however, required the use of a thermo-printer which had to be set up for each particular indicia to be recorded, and time was consumed in not only the set-up but the heating of the device to operating temperatures. Other devices, such as pressure sensitive labels, with indicia placed thereon, were also employed. However, the indicia placed upon these labels was in no way protected from the elements or from the normal conditions in which the wires were found. For example, if the wires were found in area generally moist, deterioration of the printing or indicia and the pressure sensitive label itself was commonplace. A further manner of marking, commonly used, was the use of two concentric tubes with the indicia placed on a tubular paper roll placed between the concentric plastic, or nylon, cylinders. A cable tieing device was then passed through the inner cylinder and about the cables, or pipe, to be marked. The connection was generally rather loose and generally in a direction inconvenient for reading.

SUMMARY OF THE INVENTION

The present invention obviates the deficiences of prior art devices by providing a transparent indicia supporting device which is simple to construct, light-weight and easily usable. It can, by its unique configuration, accept an indicia bearing record in a protective enclosure and by the installation of the indicia supporting device to the item or member to be marked its ability to retain the indicia bearing record within it is enhanced. The device may be fabricated in discrete lengths, or may be fabricated in continuous lengths and cut to discrete lengths as are required.

It is therefore an object of this invention to provide an improved form of indicia supporting device.

It is yet another object of this invention to provide an improved form of indicia supporting device wherein installation of the device to the object to be marked enhances the ability of the device to retain indicia bearing records placed therein.

It is still another object of this invention to provide an improved indicia supporting device which can be manufactured in discrete lengths, or can be manufactured in continuous lengths, and can be cut to discrete lengths as is desired.

Other objects and features of the invention will be pointed out in the following description and claims and illustrated in the accompanying drawings, which disclose, by way of example, the principle of the invention, and the best mode which has been contemplated for carrying it out.

DESCRIPTION OF THE PREFERRED EMBODIMENT

Figures 1, 2, 3, 4, 5, 6, 7:
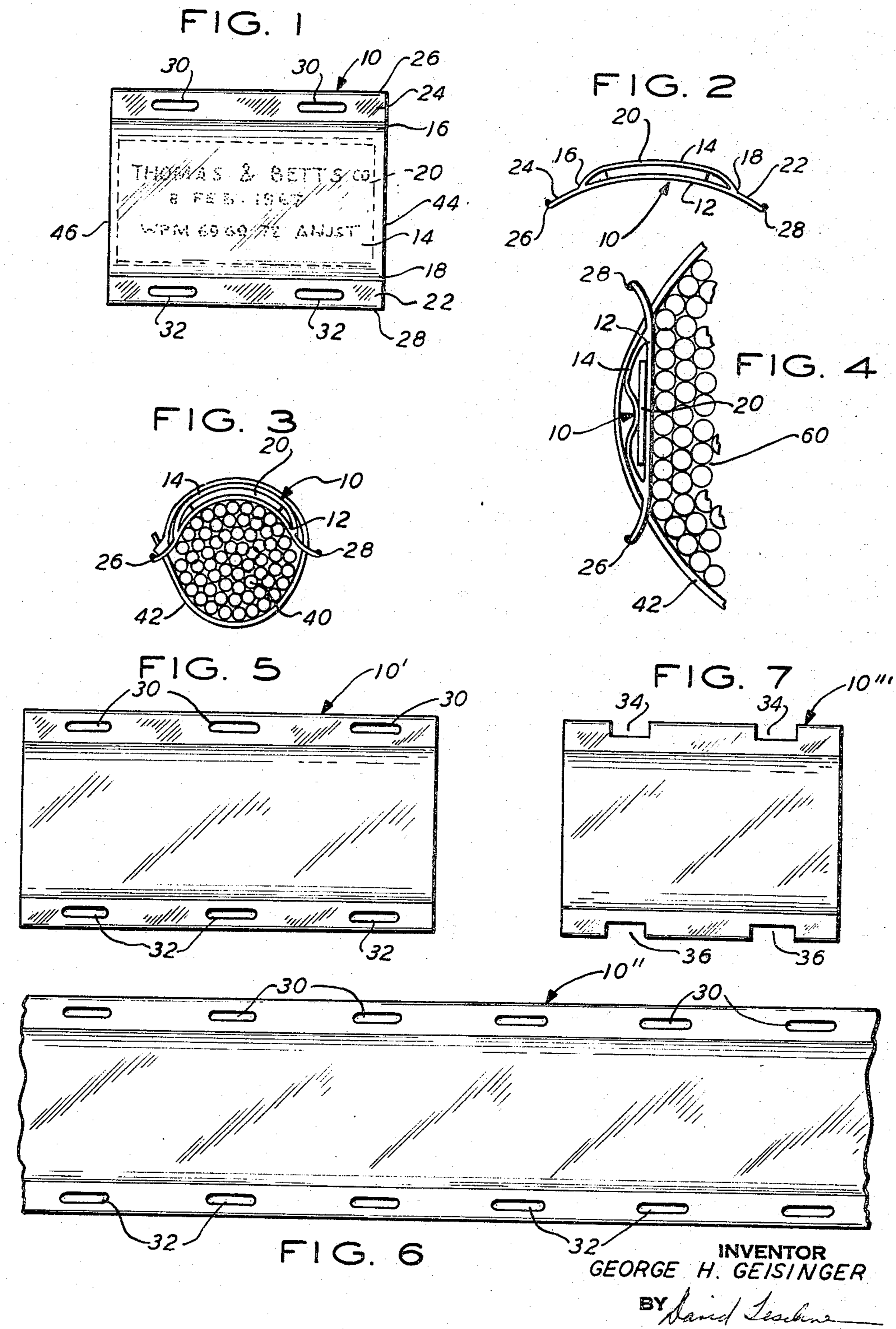
FIG. 1 is a plan view of an indicia supporting device constructed in accordance with the concepts of the invention.
FIG. 2 is a side elevation of the indicia supporting device of FIG. 1.
FIG. 3 shows the indicia supporting device of FIG. 1 installed about a bundle of wires with compressional forces exerted upon the indicia supporting device.
FIG. 4 shows the indicia supporting device of FIG. 1 installed about a bundle of wires and acted upon by tensional forces.
FIG. 5 shows an alternative embodiment of the device of FIG. 1 for accepting larger indicia bearing records.
FIG. 6 illustrates the device of FIG. 1 in a continuous form which may be cut into discrete indicia supporting devices of the types shown in FIGS. 1 and 5.
FIG. 7 shows the further alternative embodiment of the device of FIG. 1.

Turning now to FIGS. 1 and 2 there is shown an indicia supporting device 10 constructed in accordance with the concepts of the invention. Indicia supporting device 10 comprises a transparent lower flexible member 12 and a transparent upper flexible member 14, joined at edges 16 and 18. The upper and lower flexible members 12 and 14 are spaced apart by sufficient distance to permit the insertion of an indicia bearing record 20 therebetween. Extensions 22 and 24 are provided from the jointure of the upper and lower flexible members 14 and 12 respectively. The extension 24 terminates in a rib 26 while the extension 22 terminates in a rib 28. As is seen in FIG. 1 the extension 24 has a series of fully enclosed slots 30 while the extension 22 has a series of fully enclosed slots 32.

If it is desired to employ a larger indicia bearing record 20 than that which can be accommodated by the device of FIG. 1, a device 10', such as shown in FIG. 5, is employed. This device 10' will have a greater number of complementary paired apertures such as 30 and 32. In the alternative, the indicia supporting device may be fabricated in a continuous web, as shown at 10'' in FIG. 6. This web will have a series of complementary apertures such as 30 and 32 along its entire length and the web may be cut at any point to insure a minimum of two pairs of slots 30 and 32 to permit secure fastening of the indicia supporting device to the object to be marked. A further alternative, as shown in FIG. 7, replaces the enclosed slots 30 and 32 by open slots 34 and 36.

It should be evident that the rigs 26 and 28 running along the edges of the extension 24 and 22 respectively provide a smooth edge for contact between the indicia supporting device and the object to be marked and further serve to reinforce the apertures 30 and 32 to prevent their destruction and the possible loss of the indicia supporting device when used.

Turning now to FIG. 3 there is shown an indicia supporting device wrapped about a bundle of wires 40 and contains an indicia bearing record 20 inserted between the upper and lower flexible members 14 and 12 respectively. Cable bundling strap 42 has been inserted through the apertures 30 and 32 of the extensions 24 and 22 respectively on either side of the strap. Only the strap in the forward part of the figure is visible. Due to the size of the cable bundle 40 compressive forces are applied to the indicia supporting device such that the relaxed arcuate form as shown in FIG. 2 is forced to take on an arcuate position having a smaller radius than that shown in FIG. 2. As a result, greater force is applied by the upper and lower flexible members 14 and 12 respectively to the indicia bearing record 20 thus insuring against the accidental removal of the indicia bearing record 20. It should be understood however, that if desired, with proper tools it is possible to remove this indicia bearing record and insert a further record. Alternatively, if it is desired that the record be permanently contained within the indicia supporting device 10 the ends such as 44 and 46, as shown in FIG. 1, may be permanently sealed by the use of adhesive, heat sealing, sonic welding or the like. It should also be understood that the cable bundling straps 42 may be passed behind lower flexible member 14 so that they are not visible and do not block the indicia bearing record 20. Further, such an arrangement permits the cable bundling straps 42 to be pre-assembled to the indicia supporting device 10.

Turning now to FIG. 4 the form which the indicia supporting device 10 assumes when attached to a larger object, such as a large cable bundle, larger than that shown in FIG. 3, is shown. As a result of the attachment of the indicia supporting device 10 to the larger bundle of wires 60 tensional forces are applied to the indicia supporting device 10. As a result the upper flexible member 14 is caused to take on a generally concave configuration while the lower flexible member 12 takes on an almost straight configuration. As a result of the concave form of the upper flexible member 14 the indicia bearing record 20 is wedged therebetween and is firmly held. Again, if it is desired that this record not be made removable the ends such as 44 and 46, as shown in FIG. 1, may be in some way joined together in a permanent fashion. It should be understood that no particular form of cable bundling straps 42 need be used and it would be possible to provide the same action by the use of wire, wax cord, metal strapping or any similar type of device.

While there have been shown and described and pointed out the fundamental novel features of the invention as applied to the preferred embodiments, it will be understood that various omissions and substitutions and changes of the form and details of the devices illustrated and in its operation may be made by those skilled in art, without departing from the spirit of the invention.

The embodiments of the invention in which an exclusive property or privilege is claimed are defined as follows:

1. An indicia supporting device comprising: first transparent flexible means; second transparent flexible means spaced apart from said first flexible means by a distance sufficient to accept an indicia bearing record therebetween; said first and second flexible means joined to one another along two nonintersecting edges thereof; first extension means joined to said first and second flexible means at a first one of their jointures; second extension means joined to said first and second flexible means at the second of their jointures; a plurality of completely enclosed slots in said first and second extensions adapted to receive fastening devices; and each of the edges of said first and second extensions remote from their jointure with said first and second flexible means has a rib extending along said extension edge, whereby said extension is prevented from abrading a member to be marked and said slots are reinforced.

2. An indicia supporting device as defined in claim 1, wherein said first and second flexible means are generally arcuate between said first and second extensions.

3. An indicia supporting device as defined in claim 2, wherein the application of tensional forces to said extensions by means of said fastening devices causes said first flexible member to assume a generally straight position while said second flexible member assumes a generally concave position whereby said indicia bearing record is securely held between said first and second flexible means.

4. An indicia supporting device as defined in claim 2, wherein the application of compressional forces to said extensions by means of said fastening devices causes said first and second flexible means to assume an arcuate position having a smaller radius than that of said first and second flexible means in its condition before such compressional forces are applied whereby said indicia bearing record is securely held between said first and second flexible means.

References Cited

UNITED STATES PATENTS

| | | | |
|---|---|---|---|
| 1,764,003 | 6/1930 | Bush | 40—21 |
| 2,054,227 | 9/1936 | Nichols | 40—21 |
| 2,201,139 | 5/1940 | Ivey | 40—21 |
| 2,203,155 | 6/1940 | Julien et al. | 40—21 |
| 3,269,041 | 8/1966 | Marcus | 40—21 X |

EUGENE R. CAPOZIO, Primary Examiner

W. J. CONTRERAS, Assistant Examiner

U.S. Cl. X.R.

40—21